Patented Sept. 11, 1928.                                              1,683,695

UNITED STATES PATENT OFFICE.

WALTER A. PATRICK AND EARLE H. BARCLAY, OF BALTIMORE, MARYLAND, ASSIGNORS TO THE SILICA GEL CORPORATION, OF BALTIMORE, MARYLAND, A CORPORATION OF MARYLAND.

METHOD OF PREPARING TUNGSTEN OXIDE GEL.

No Drawing.           Application filed March 29, 1927.   Serial No. 179,387.

This invention relates to a method of preparing a hard, stable, highly porous gel of tungsten oxide.

According to the present invention, to prepare the desired stable, highly porous gel of tungsten oxide, a solution of an acid, such as hydrochloric acid or sulphuric acid, is added to a solution of sodium tungstate of about 3% to 8% strength, with stirring until a precipitate is formed. This requires only a small amount of acid. The reaction mass is then stirred until this precipitate dissolves, whereupon more acid is added, the total amount of acid used being such as to give a final acidity of the whole mixture, after the reaction, equal to about 0.1 N. to 0.5 N. With this acidity, the reaction mixture or sol will coagulate or set to a hydrogel in a few minutes, say from 4 to 30 minutes at room temperature.

At a higher temperature the setting occurs more quickly, and at lower temperatures more slowly. A good working range for the temperature is 15° C. to 80° C., but it is to be understood that it is not necessary to work within this range.

The tungstate and acid solutions may be mixed together in almost any manner desired, for example by flowing streams of each solution into contact, with stirring, provided that an excess of the tungstate solution over the acid solution is present during the first part of the mixing.

The hydrogel formed as described is rather soft and must be washed carefully. It is broken into pieces and washed free from acid and salt. If the wash water is heated, this step is expedited.

The washed hydrogel is now carefully dried to secure the final product. For this purpose the hydrogel is first dried in a stream of air at 75° to 120° C. and after a time, the temperature is slowly increased to 300° to 400° C. The hydrogel may be dried at a lower temperature, say 120° C., but this will take a longer time. The drying is continued until the water content of the final product is 5% to 15%, although the invention is not limited to dehydrating to these percentages. In a general way, it may be stated that the hydrogel is dehydrated to the desired water content which is generally not less than 3%. The hydrogel may be dehydrated in other ways known in the art.

A slightly modified method of mixing the solutions will now be described. In this modified method, the acid solution is added, at first drop by drop, to the sodium tungstate solution, with stirring. At first a white precipitate forms, upon the addition of each drop of acid, which re-dissolves on stirring. After about half of the required acid has been added, the precipitate no longer forms, and the balance of the acid may then be added rapidly.

Using an aqueous solution of sodium tungstate ($Na_2WO_4$—$2H_2O$) of 8% strength and 6.38 N. nitric acid, in varying proportions, the following was noted, the ingredients being mixed at room temperature:

Table 1.

| Cc. acid | Cc. tungstate | Acidity of mixture after complete mixing | Time to set in minutes |
|---|---|---|---|
| 1.00 | 10 | .145 N. | 15+ |
| 1.30 | 10 | .311 N. | 15− |
| 1.60 | 10 | .465 N. | 10 |

A good product is obtained with each of these three concentrations and proportions.

Using a tungstate solution of 5% strength and a nitric acid solution of 10% strength, and adding water in each instance to make the total volume 6 cc., the following was noted for three different proportions, the ingredients being mixed at room temperature and the process of mixing being the same as described above, that is, the acid solution was added drop by drop at first:

Table 2.

| Cc. acid | Cc. tungstate | Cc. $H_2O$ | Acidity of mixture after complete mixing | Time to set in minutes |
|---|---|---|---|---|
| .6 | 5 | .4 | +0.01 N. | 25 |
| .8 | 5 | .2 | +0.11 N. | 4 |
| 1.0 | 5 | 0 | +0.22 N. | 2 |

A good product was obtained with each of these proportions.

According to the present invention, mixed or plural gels may be prepared, for example, a hard, stable, highly porous gel of the oxides of silica and tungsten. For this purpose sols for each oxide are prepared, that is to say, a sol of silicic acid of such concentrations and proportions that it will set to a hydrogel which can be dried and washed to give a hard, highly porous, final product, and a sol of tungstic acid that likewise will set to a hydrogel that can be washed and dried to give a hard, porous tungstic gel. The method of preparing a sol of tungstic acid of this kind has been described herein. The sol of silicic acid may be prepared by mixing, with vigorous stirring, solutions of an acid and a soluble silicate of such proportions and concentrations as to give a sol having an acidity ranging from nearly neutral to 0.9 N.

These two sols are then mixed together and after a time, set to a hydrogel which is washed and nearly dehydrated as described herein. The final product is a hard, stable, highly porous gel of the oxides of silica and tungsten, and will adsorb water vapor to such an extent as to contain at least 21% of its weight (dry) of water when in equilibrium with water vapor at 30° C. and a partial pressure of 22 mm. of mercury.

Having thus described the invention, what is claimed as new and desired to be secured by Letters Patent is:

1. The process of preparing a tungsten oxide gel which comprises adding acid to a solution of a tungstate with stirring, in such proportions that the final acidity after reaction will be about $\frac{1}{10}$ to $\frac{5}{10}$ normal, the addition of acid being stopped on the appearance of a precipitate until such precipitate redissolves on stirring whereupon more of the acid may be added, allowing the resulting sol to set to a hydrogel, and washing and partially dehydrating it.

2. The process of preparing a tungsten oxide gel which comprises adding acid to a solution of a tungstate of 3% to 8% strength with stirring, in such proportions that the final acidity after reaction will be about $\frac{1}{10}$ to $\frac{5}{10}$ normal, the addition of acid being stopped on the appearance of a precipitate until such precipitate redissolves on stirring whereupon more of the acid may be added, and allowing the resulting sol to set to a hydrogel.

3. In the process of preparing a tungsten oxide gel which comprises adding acid to a solution of tungstate with stirring, in such proportions that the final acidity after reaction will be about $\frac{1}{10}$ to $\frac{5}{10}$ normal, the addition of acid being stopped on the appearance of a precipitate until such precipitate redissolves on stirring whereupon more of the acid may be added, and allowing the resulting sol to set to a hydrogel.

In testimony whereof we hereunto affix our signatures.

WALTER A. PATRICK.
EARLE H. BARCLAY.